United States Patent
Zarn et al.

(10) Patent No.: US 6,886,489 B2
(45) Date of Patent: May 3, 2005

(54) COVER FASTENING SYSTEM FOR A BOAT

(75) Inventors: Paul David Zarn, Henning, MN (US); Keith Jeffrey Boyne, Perham, MN (US); Larry Harlan Lovold, Lake Park, MN (US)

(73) Assignee: Lund Boat Company, Minneapolis, MN (US)

( * ) Notice: Subject to any disclaimer, the term of this patent is extended or adjusted under 35 U.S.C. 154(b) by 0 days.

(21) Appl. No.: 10/718,139

(22) Filed: Nov. 20, 2003

(65) Prior Publication Data

US 2004/0149198 A1 Aug. 5, 2004

Related U.S. Application Data

(60) Provisional application No. 60/445,321, filed on Feb. 4, 2003.

(51) Int. Cl.[7] ................................................ B63B 17/00
(52) U.S. Cl. ........................................ 114/361; 411/913
(58) Field of Search ................................ 114/361, 364, 114/343, 356, 219; 411/913

(56) References Cited

U.S. PATENT DOCUMENTS

| | | | | |
|---|---|---|---|---|
| 2,732,877 A | * | 1/1956 | Taylor | 114/361 |
| 2,961,725 A | * | 11/1960 | McGee | 114/361 |
| 4,993,351 A | * | 2/1991 | Zirkelbach et al. | 114/361 |
| 5,189,980 A | * | 3/1993 | Zirkelbach et al. | 114/361 |
| 5,743,204 A | * | 4/1998 | Tweet | 114/219 |
| 5,839,388 A | * | 11/1998 | Vadney | 114/361 |

* cited by examiner

*Primary Examiner*—Lars A. Olson
(74) *Attorney, Agent, or Firm*—Malin, Haley & Dimaggio, P.A.

(57) ABSTRACT

A cover fastening system for a boat, the system including a groove formed along a side of the boat. A plurality of expandable anchors is positionable within the groove. Also included are a plurality of fastening members, each fastening member including a threaded portion and a snap portion, the threaded portion of each fastening member being screwed within a respective anchor to expand and fix the anchor at a desired position along the groove, and the snap portion being adapted to engage a corresponding snap structure of a boat cover.

12 Claims, 5 Drawing Sheets

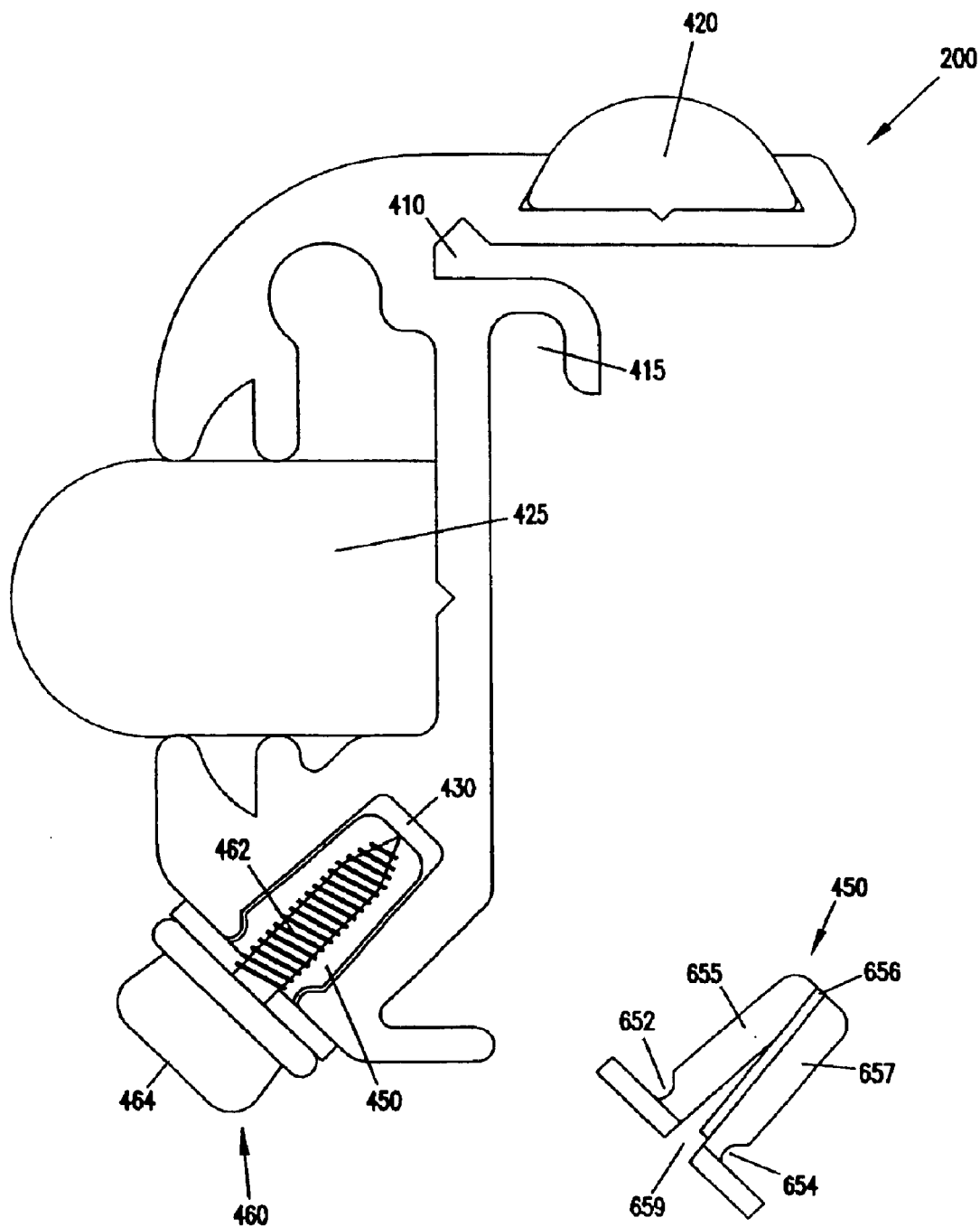

COVER FASTENING SYSTEM FOR A BOAT

CROSS REFERENCE TO RELATED APPLICATION

The present application claims the benefit of U.S. Provisional Patent Application Ser. No. 60/445,321, filed Feb. 4, 2003, of which application is incorporated herein by reference in its entirety.

TECHNICAL FIELD

The present invention relates generally to a system and method for fastening a cover to a boat.

BACKGROUND

Covers are used to protect interiors of boats from the elements. Covers are typically removed while the boat is in use, and the covers are placed on the boat when the boat is not in use or in storage.

Different systems for fastening a cover to a boat are known in the art. These systems include fasteners coupled to the boat and snaps carried on the cover to engage the fasteners and thereby hold the cover in place. Typically, the fasteners are mounted to the boat by drilling holes in the boat at the desired positions and threading fasteners into each of the holes.

The above-described types of fastening systems are undesirable for several reasons. For example, the drilling of the holes in the boat is undesirable because such holes may cause leaks or corrosion. Further, once a hole for a fastener is drilled, it cannot be moved if, for example, the hole is positioned incorrectly, the cover being used stretches out of its initial configuration with use, or a different cover is used.

Several fastening systems allow the position of the fasteners carried on the boat to be varied. See, for example, U.S. Pat. Nos. 2,961,725, 3,367,349, 4,292,913, 5,331,993, and 5,471,715. However, these systems suffer from further drawbacks. For example, some of these systems do not allow for ease in the positioning of the fasteners on the boat. Others do not allow for the fasteners to be reliably fixed in a desired position on the boat. Still other systems do not allow for ease in increasing or decreasing the number of fasteners used to hold the cover.

SUMMARY

One aspect of the present invention relates to a system and method for fastening a cover to a boat.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 3 is a magnified view of the gunwale member of FIG. 2;

FIG. 4 is shows the gunwale member of FIG. 2 including an example anchor and fastening member;

FIG. 6 shows an example anchor made in accordance with an aspect of the present invention.

Figure 1:
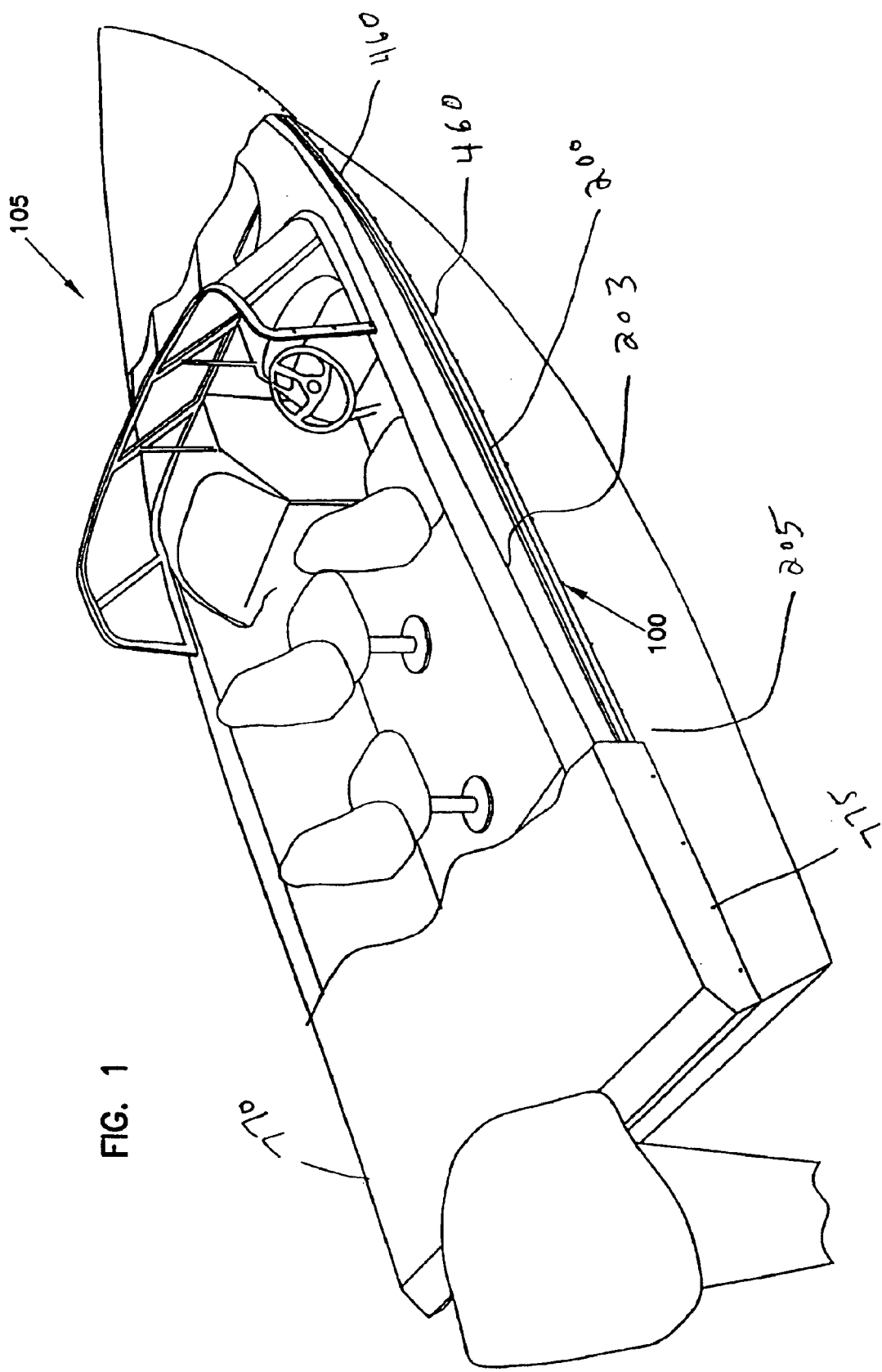
FIG. 1 is a perspective view of a boat including an example cover fastening system made in accordance with an aspect of the present invention.

While the invention is amenable to various modifications and alternative forms, the specifics there have been shown by way of example in the drawings and will be described in detail below. It is to be understood, however, that the intention is not to limit the invention to a particular embodiment. On the contrary, the intention is to cover all modifications, equivalents and alternatives falling within the scope of the invention as defined by the appended claims.

DETAILED DESCRIPTION

In the following detailed description, references are made to the accompanying drawings that depict various embodiments which are examples of how inventive concepts in accordance with the principles of the present disclosure may be practiced. It is to be understood that other embodiments may be utilized, and that structural and functional changes may be made without departing from the scope of the present invention. One inventive aspect of the present disclosure relates to a system for securing a cover to a boat. The system includes a receiver (e.g., a groove or track) provided on or defined by the boat. The system also includes fastening structures (e.g., snaps) anchored within the receiver. The fastening structures are adapted to connect with corresponding fastening structures on the cover to secure the cover to the boat.

FIG. 1 shows an example system 100 and method for fastening a cover 770 to a boat 105. The boat 105 includes a top deck 203 and a hull side wall 205 that are interconnected by a gunwale member 200. Fastening members 460 are secured to the gunwale member 200. The fastening members 460 are adapted to interconnect with corresponding fastening members 775 of the cover 770 to secure the cover 770 to the boat. The fastening members 460 are preferably secured to the gunwale 202 by anchors 450 (shown in FIG. 7) mounted within a groove 430 (shown in FIG. 7) defined by the gunwale 202.

A detailed description is provided below of the various components comprising the example fastening system 100 and a method of using the system. The description below is provided by way of example only. Other configurations and methods of use are also possible.

I. The Gunwale Member

Figure 2:
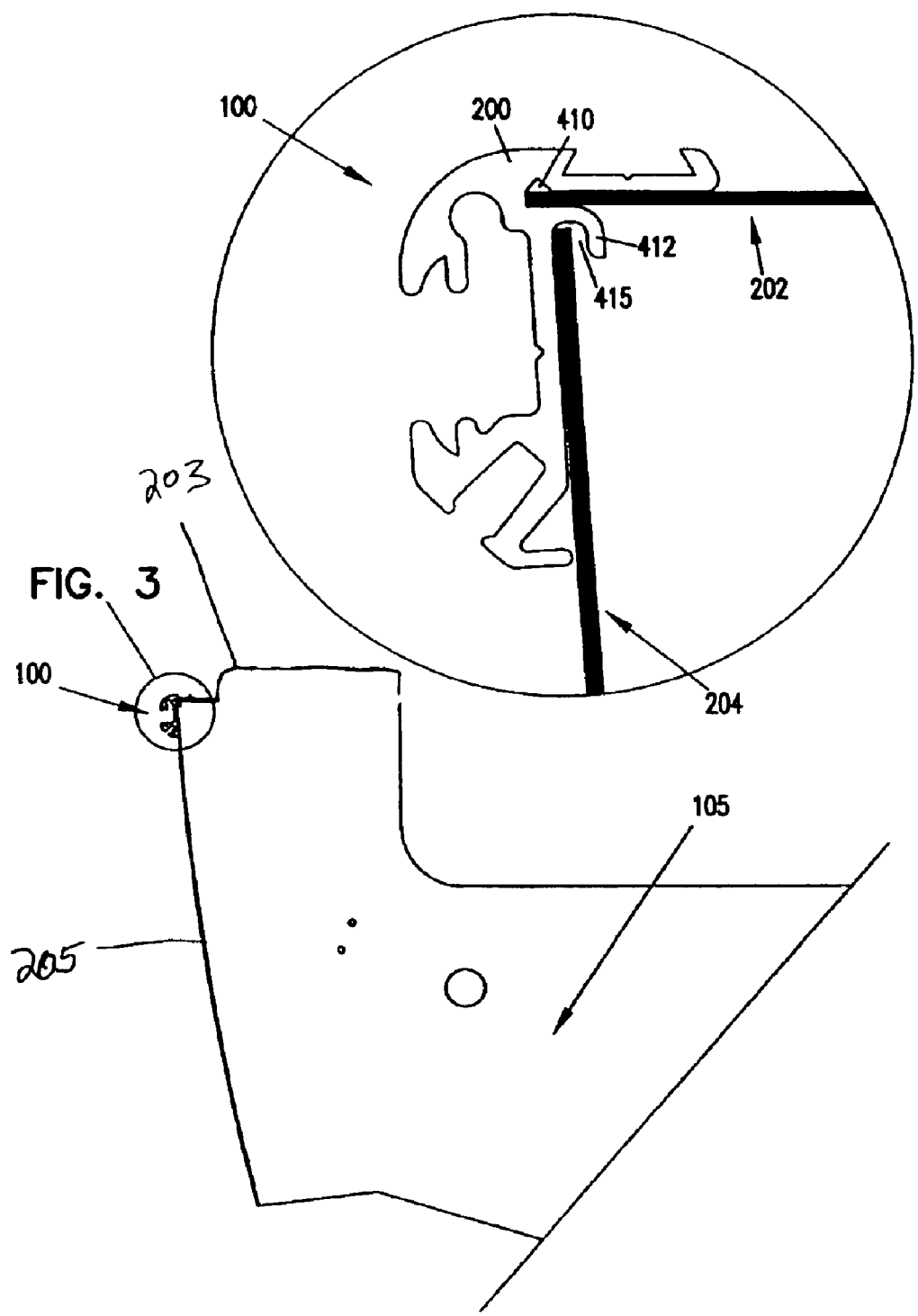
FIG. 2 is a rear view of an end portion of a boat including an example gunwale member made in accordance with an aspect of the present invention.

Referring now to FIGS. 2–5, example gunwale member 200 of the system 100 is more clearly shown. As shown in FIGS. 2 and 3, the gunwale member 200 is positioned at an intersection of a weatherboard 202 and a freeboard 204. In the depicted embodiments, weatherboard 202 forms the top deck 203 of the boat 105, and the freeboard 204 forms the side hull 205 of the boat 105. The gunwale member 200 includes a slot 410 to receive a generally horizontal portion of the weatherboard 202 and a slot 415 to receive a generally vertical portion of the freeboard 204. Slot 415 is defined by a hook 412. See FIG. 4. In this configuration, the gunwale member 200 forms a corner or interface between the side of the boat and a top deck structure of the boat.

Figure 7:
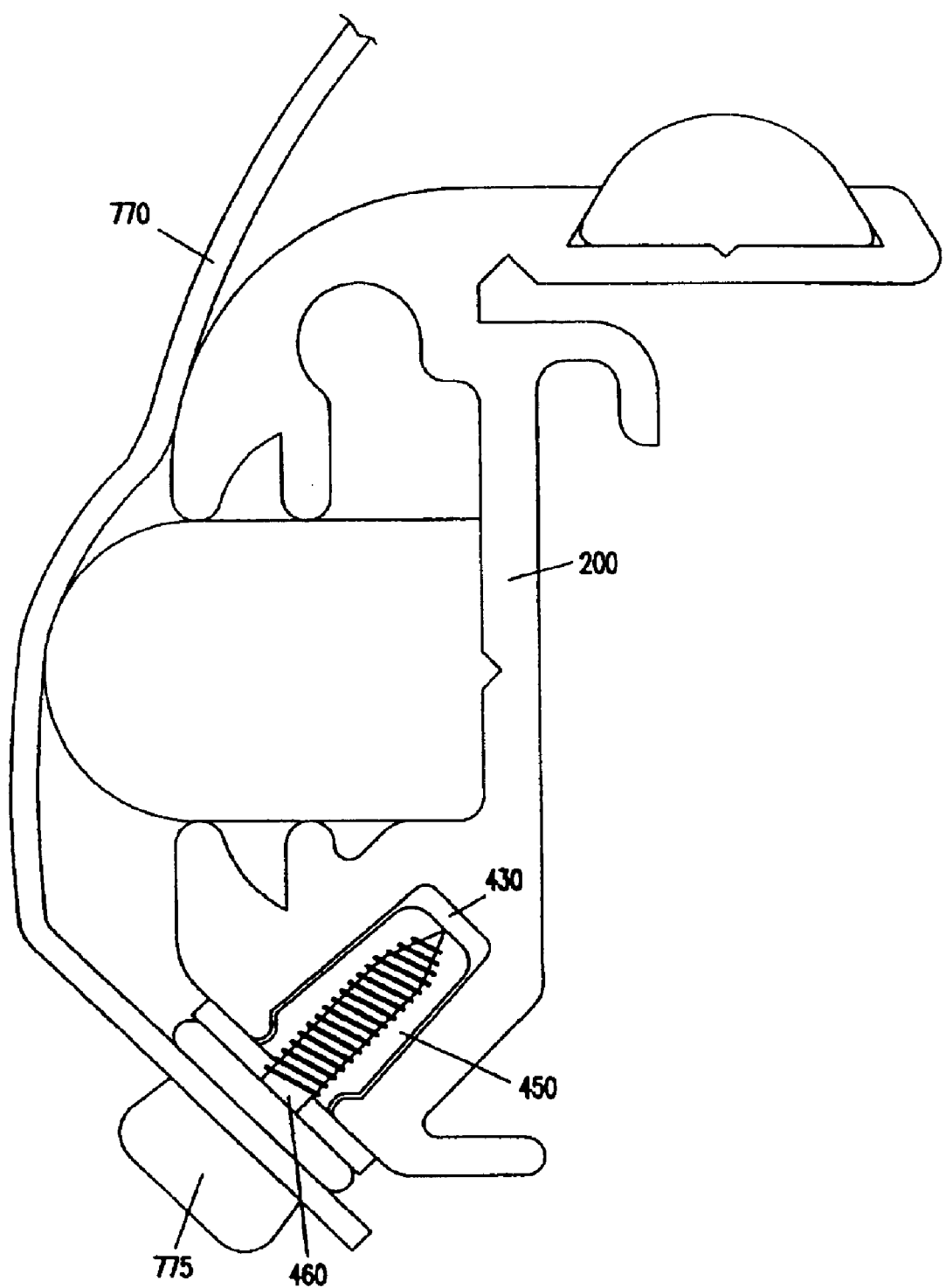
FIG. 7 shows the gunwale member of FIG. 4 including an example cover attached to the gunwale member.

The gunwale member 200 also includes channels 420 and 425 sized to receive bumpers 107 (see FIGS. 1, 4, and 7).

The example bumpers 107 are made of vinyl and are designed to absorb energy generated when the boat 105 impacts another object, as well as to reduce scratching of the outer surface of the boat 105. Other materials for the bumpers may also be used, such as rubber.

Figure 5:
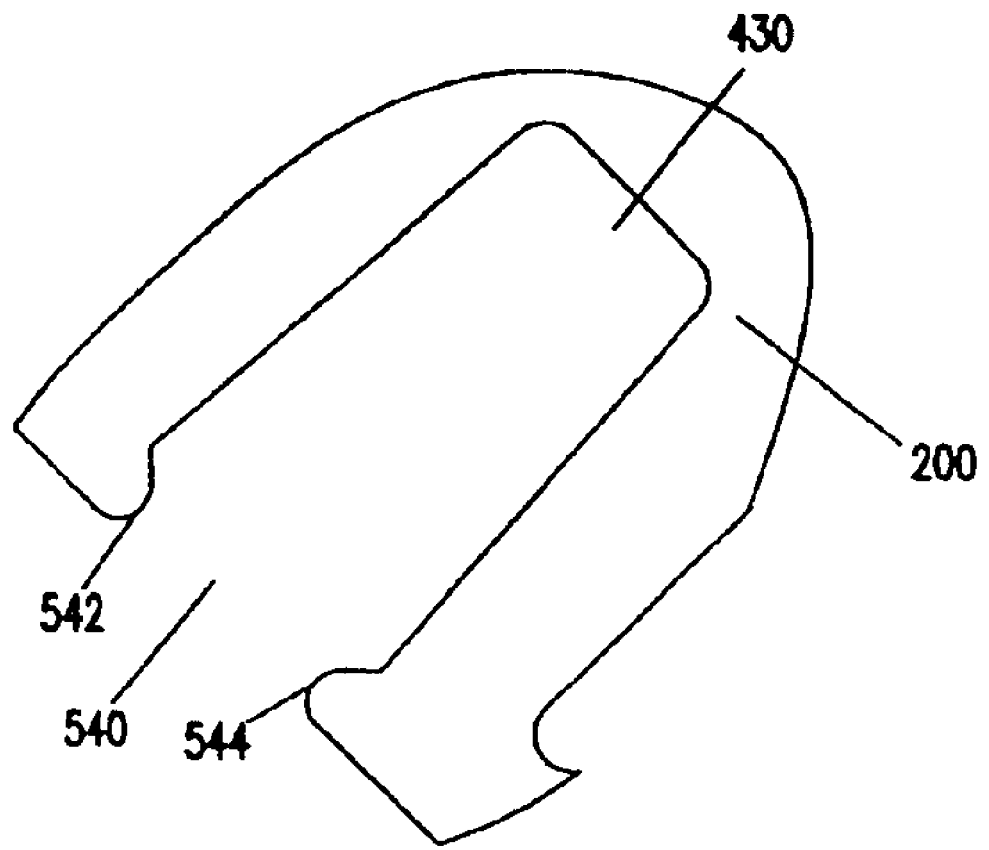
FIG. 5 shows a portion of the gunwale member of FIG. 2 including the groove.

The gunwale member 200 further includes groove 430 (see FIGS. 4 and 5). The gunwale member 200 includes fingers 542 and 544 defining an opening 540 to the groove 430. The groove 430, as described further below, is configured to receive an anchor and a fastening member. In addition, the illustrated groove 430 is downwardly angled. In alternative embodiments, the groove can be positioned horizontally or vertically downward.

The illustrated gunwale member 200 is an extrusion made of aluminum and extends along a substantial length of the side of the boat 105 (see FIG. 1). For example, the gunwale member can extend at least ¼ of the length of the side of the boat, preferably at least ½ of the length, and more preferably the entire length. A similarly-constructed gunwale member is preferably provided on the opposite side of the boat 105.

Other structures can also be used to form the groove 430. For example, the groove can be integral with the gunwale as shown, integral with the hull, or formed by other means such as a track affixed to the hull, gunwale or the top deck.

II. The Anchor

Referring to FIGS. 4 and 6, the example anchor 450 of the system 100 is depicted. The anchor 450, as shown in FIG. 6, includes first and second parts 655 and 657 joined at a first end 656 and defining an opening 659 at a second end. The opening 659 is sized to accept a fastening member. The anchor 450 further includes indentations 652 and 654 formed adjacent the opening 659, the indentations 652 and 654 being sized to engage the fingers 542 and 544 (see FIG. 5) of the gunwale member 200.

The parts 655 and 657 are configured to move towards and away from one another to allow the anchor 450 to expand and contract. In other words, the anchor 450 is expandable from an unexpanded state to an expanded state. The anchor 450 is tapered slightly from the first end 656 to the opening 659 to allow the anchor 450 to be easily inserted into the groove 430 of the gunwale member 200. The anchor 450 expands as a fastening member is inserted into the opening 659 of the anchor, as described further below.

The anchor 450 is made of plastic, although other similar materials, such as steel, can also be used. In the example shown, the anchor 450 is available from Taylor Made Systems of Gloversville, N.Y.

III. The Fastening Member

Referring to FIG. 4, the example fastening member 460 of the system 100 is shown. The fastening member 460 includes a threaded portion 462 and a snap portion 464. The threaded portion 462 is configured to be screwed into the anchor 450, while the anchor 450 is positioned within the groove 430 of the gunwale member 200. As the fastening member 460 is screwed into the opening 659 of the anchor 450, the width of the threaded portion 462 forces the first and second parts 655 and 657 of the anchor 450 apart, thereby expanding the anchor 450 within the groove 430. The interior of the anchor 450 can be internally threaded to mate with the threads of the threaded portion 462, or, in the alternative, the threaded portion 462 can self-thread within the anchor 450. In the fully expanded state, as shown in FIG. 4, the indentations 652 and 654 of the anchor 450 engage the fingers 542 and 544 of the gunwale member 200, thereby retaining the anchor 450 and the fastening member 460 at a desired position along the groove.

The snap portion 464 of the fastening member 460 defines a male snap. The male snap is configured to accept a female snap. For example, as shown in FIG. 7, a cover 770 may include a female snap 775. Once the fastening system 100 is positioned as desired, the female snap 775 on the cover 770 is coupled to the male snap 775 on the fastening member 460 to fasten the cover 770 in place.

In the embodiment shown, the fastening member 460 is made of steel, and may be obtained from Arden Fasteners of St. Paul, Minn. Other materials and suppliers may be used. In other embodiments, the male and female snaps can be reversed such that the female snap is on the boat and the male snap is on the cover. Different types of fasteners other than snaps can also be used, such as hook and loop, turn-latch, etc.

IV. Method of Use

A method of using the example fastening system 100 is as follows. First, the anchor is placed within the groove of the gunwale member. While unexpanded, the anchor can be repositioned within the groove to the desired position along the groove. For example, to reposition the anchor, the unexpanded anchor can be removed from the groove and inserted at a new location within the groove, or slid along the groove to a new position.

Once positioned as desired, the threaded portion of the fastening member is screwed into the anchor. As the fastening member is screwed into the anchor, the anchor expands within the groove. When the fastening member is fully seated in the anchor, the anchor is fully expanded within the groove to hold both the anchor and fastening member in a desired position with respect to the groove. Friction between the expanded anchor and the gunwale member prevents the anchor from being unintentionally moved. The anchor can be positioned at an infinite number of locations along the length of the groove.

With the fastening member at the desired position, the female snap carried on the cover is coupled to the male snap of the fastening member, thereby coupling the cover to the boat.

If the anchor and fastening member are not in the desired position, or if it later becomes desirable to move the anchor and fastening member, the fastening member is unscrewed from the anchor far enough so that the anchor contracts to a point at which the anchor can be slid within the groove to the new desired position. The fastening member may need to be only partially removed from the anchor before the anchor can be slid within the groove.

Although the method of positioning and using one fastening member and anchor has been described, typically a plurality of fastening members and anchors will be used to fasten the cover to the boat. For example, it is desirable to use one anchor and fastening member for each snap provided on a cover for a boat. Each fastening member and anchor are positioned and fixed in a manner similar to that described above.

The fastening system 100 exhibits many advantages. For example, the groove allows the fastening members to be positioned on the boat without requiring holes to be made in the boat. Also, the ability to slide the anchors within the groove allows the fastening members to be moved to any desired location along the groove. In addition, the expansion of the anchors within the groove allows the anchors and fastening members to be fixed to the groove at the desired location so that the cover can be easily attached to the fastening members.

Having described aspects and example embodiments of the present invention, modifications and equivalents of the disclosed concepts may readily occur to one skilled in the art. For example, the threaded portion of the fastening member can be replaced with a smooth member that is configured to contract as it is inserted into the anchor and then expand when received in the anchor, thereby expanding the anchor and fixing the anchor and fastening member in place. In another example, the single groove extending along the side of the boat can be replaced with multiple grooves of shorter length positioned at desired locations along the side of the boat.

It is intended that such modifications, as well as other modifications and equivalents, be included within the scope of the claims that are appended hereto.

What is claimed is:

1. A boat including a cover fastening system, the boat comprising:

a body of the boat including first and second sides;

a groove defined along the first side of the boat;

a plurality of expanding anchors positionable within the groove; and a plurality of fastening members, each fastening member including a locking portion and a mounting portion, the locking portion of each fastening member being received within a respective anchor to expand and fix the anchor at a desired position along the groove, and the mounting portion being adapted to engage a corresponding mounting structure of a coat cover;

wherein the first side of the boat includes a freeboard extending in a generally vertical direction, a weatherboard extending in a generally horizontal direction, and a gunwale member extending along the first side of the boat, the gunwale member defining a first receiving portion to accept one end of the freeboard and a second receiving portion to accept one end of the weatherboard, and wherein the gunwale member further defines the groove that receives the plurality of anchors.

2. The boat of claim 1, wherein the locking portion of each fastening member is a threaded portion.

3. The boat of claim 1, wherein the mounting portion of each fastening member is a snap portion.

4. The boat of claim 1, wherein the gunwale member is an extrusion.

5. The boat of claim 1, wherein the gunwale member is made of aluminum.

6. The boat of claim 1, wherein the gunwale member further defines a channel configured to hold a bumper.

7. The boat of claim 1, wherein each fastening member and respective anchor is configured to slide along the groove and be located at a plurality of positions along the first side the boat.

8. The boat of claim 1, wherein the groove extends along a substantial length of the first side of the boat.

9. The boat of claim 1, wherein the groove is downwardly angled.

10. A boat including a side having gunwale extrusion, the boat comprising:

a weatherboard connected to the extrusion; and a freeboard connected to the extrusion;

wherein the extrusion defines a groove that extends along a substantial length of the side of the boat;

an upwardly facing channel defined by the extrusion and configured to receive a first bumper; and a laterally facing channel defined by the extrusion and configured to receive a second bumper.

11. The boat of claim 10, further comprising a plurality of anchors and respective fastening members positioned within the groove.

12. The boat of claim 10, wherein the groove is downwardly angled for receiving anchors.

* * * * *